US010500831B2

(12) United States Patent
Share (10) Patent No.: US 10,500,831 B2
(45) Date of Patent: Dec. 10, 2019

(54) TEMPERATURE CONTROL SYSTEM FOR 3D PRINTER EXTRUSION HEAD

(71) Applicant: Robert Bosch Tool Corporation, Mount Prospect, IL (US)

(72) Inventor: Eli Charles Share, Northfield, IL (US)

(73) Assignee: Robert Bosch Tool Corporation, Mount Prospect, IL (US)

( * ) Notice: Subject to any disclaimer, the term of this patent is extended or adjusted under 35 U.S.C. 154(b) by 217 days.

(21) Appl. No.: 15/222,128

(22) Filed: Jul. 28, 2016

(65) Prior Publication Data

US 2018/0029307 A1 Feb. 1, 2018

(51) Int. Cl.
*B33Y 30/00* (2015.01)
*B33Y 40/00* (2015.01)
*B33Y 50/02* (2015.01)

(52) U.S. Cl.
CPC ............... *B33Y 30/00* (2014.12); *B33Y 40/00* (2014.12); *B33Y 50/02* (2014.12)

(58) Field of Classification Search
CPC ......... B33Y 30/00; B33Y 40/00; B33Y 50/02; B29C 64/118; B29C 64/30
See application file for complete search history.

(56) References Cited

U.S. PATENT DOCUMENTS 6,054,077 A * 4/2000 Comb .................... B29C 48/92
264/40.7
2016/0236408 A1* 8/2016 Wolf ..................... B33Y 30/00

FOREIGN PATENT DOCUMENTS

| CN | 204585844 U | | 8/2015 |
| CN | 204820369 U | * | 12/2015 |
| CN | 204820369 U | | 12/2015 |
| WO | 2015/057886 A1 | | 4/2015 |

OTHER PUBLICATIONS

International Search Report dated Oct. 26, 2017, of the corresponding International Application PCT/EP2017/068572 filed Jul. 24, 2017.

* cited by examiner

*Primary Examiner* — Jacob T Minskey
*Assistant Examiner* — Melody Tsui
(74) *Attorney, Agent, or Firm* — Norton Rose Fulbright US LLP (57) ABSTRACT

A temperature control system for the extruder of a 3-D printer includes a blower and a baffling system to cool different components of the extruder using the same blower by directing air flow of the blower into two passages arranged at an outlet of the blower.

14 Claims, 7 Drawing Sheets

TEMPERATURE CONTROL SYSTEM FOR 3D PRINTER EXTRUSION HEAD

FIELD OF INVENTION

The present invention generally relates to a temperature control system for an extruder of a three-dimensional ("3-D") printer, and more specifically, to configurations of a temperature control system that enable controlling the temperature of multiple components of the extruder using one cooling fan or blower.

BACKGROUND

3-D printing, or additive manufacturing, is a process of making three dimensional solid objects based on blueprints provided by digital files. The synthesis of the desired 3-D solid object is achieved by strategically generating successive layers of an additive material in a pattern on a platform of a 3-D printer until the entire object is created. The synthesis of the 3-D object is driven by the digital files that provide the specifications that describe how to create the pattern of layers and the materials used to generate the object. The digital files specifying the design are provided by the user, and examples of the digital files read by the 3-D printer include G-code files, computer-aided design ("CAD") files, STereoLithography ("STL") CAD files, and other file types generally used in additive manufacturing processes. In some instances, the digital files refer to a 3-D model of a new object, but alternatively, the digital files can refer to a copy of an object derived from the usage of a 3-D scanner.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3-D printer to generate the 3-D object can include, for example, any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil.

For some additive processes, the ink is referred to as a filament and the filament is held in cartridges that are referred to as spools. The filament is typically provided in long strands having a small diameter, and they are wrapped in the form of reels around the spools, which secure the filament in place before the filament is fed into a filament guide or a filament tube. After the filament is fed into the filament guide, the filament is pulled by an extruder through a feed tube and into an extruder head. Then a stepper motor of the extruder grips the filament and begins to pull the filament such that the filament unwinds from the spool. After the stepper motor of the extruder begins to pull the filament through the feed tube and into the extruder head, a heater in the extruder head heats the filament to a temperature set by the 3-D printer, and the heated filament is released through a nozzle end of the extruder head. The heated filament is strategically released in successive layers in a pattern on the platform of the 3-D printer, which creates a solid object.

With 3-D printing, having good temperature control of the filament being melted and extruded for building the solid object is crucial. Improper heating of the filament, such as overheating and underheating, can cause the filament to clog in the extruder, particularly the feed tube and the nozzle.

SUMMARY

A summary of certain example embodiments of the present invention is set forth below. It should be understood that these aspects are presented merely to provide the reader with a brief summary of these certain embodiments and that these aspects are not intended to limit the scope of the present invention. Indeed, this invention can encompass a variety of aspects that may not be set forth below.

The extruder of a 3-D printer can include heat exchangers, insulating tubes, and axial fans as systems of temperature control. However, such systems utilize multiple components, such as multiple cooling fans, to cool respective ones of multiple components of the extruder, such as the feed tube and the nozzle, resulting in a system that is not cost effective. Further, the presence of multiple cooling components results in a large, bulky extruder.

Accordingly, example embodiments of the present invention provide a temperature control system utilizing a single blower or fan with a baffling system to cool both the feed tube and surrounding heat sink, and also the nozzle, allowing for efficient, two-part cooling. By reducing the number of components in the temperature control system to a single blower, but maintaining the ability to cool multiple extruder components with the baffling system, the resulting temperature control system is lower in cost, and also permits a reduced extruder size. Such a system also results in reduced electronic controls from outside the extruder, as there is space within the extruder to include a circuitry system. Other advantages include a higher quality product, simplified assembly and manufacturing, and isolated cooling zones.

According to example embodiments, there is provided an extruder that includes an extruder cover containing a filament inlet; a feed tube; a heat sink surrounding the feed tube; a heating block surrounding the feed tube and positioned below the heat sink; a heat guard configured surrounding the heating block and containing a plurality of outlet slots; a nozzle on a distal end of the feed tube and protruding out of the heating block; a blower with an air inlet and an air exit; and a channel divided by at least one baffle into at least two air passages, each of the at least two air passages with its own respective inlet, where the channel is positioned below the air exit of the blower such that air flow from the air exit of the blower enters the channel, where a first air passage of the at least two air passages is configured to direct a portion of air flow from the blower across the heat sink and through an outlet, and where a second air passage of the at least two air passages is configured to direct another portion of air flow from the blower through the plurality of outlet slots in the heat guard and across the nozzle.

In some example embodiments, the plurality of outlet slots in the heat guard consists of four outlet slots.

In some example embodiments, the four outlet slots are arranged in the heat guard to surround the nozzle such that two of the four slots are parallel to each other, and the other two of the four slots are parallel to each other.

In some example embodiments, the heating block contains a heater and a thermocouple.

In some example embodiments, the extruder also includes a circuitry system, a plurality of microswitches, a ribbon cable, a plurality of servomotors, a leveling arm, and a stepper motor, where the circuitry system is configured to relay operating information to the ribbon cable to control the blower, the plurality of microswitches, the plurality of servomotors, the leveling arm, the stepper motor, and the heating block.

In some example embodiments, the ribbon cable is attached to a motherboard, e.g., on an underside of the extruder.

In some example embodiments, one of the plurality of microswitches is a sensor configured to sense runout of filament.

In some example embodiments, the extruder also includes a filament guide, where the filament guide is integrated into the extruder cover and configured to guide filament into the filament inlet.

In some example embodiments, the blower is mounted on one side of the extruder.

In some example embodiments, the air inlet of the blower includes a fan with a plurality of fins.

In some example embodiments, the extruder also includes a louver, where the louver is configured to at least partially close the inlet to one of the at least two air passages.

In some example embodiments, the louver is configured to completely close the inlet to the first air passage and direct all air flow from the blower through the second air passage through the plurality of slots in the heat guard and across the nozzle.

In some example embodiments, the louver is configured to completely close the inlet to the second air passage and direct all air flow from the blower through the first air passage across the heat sink and through the outlet.

In some example embodiments, the louver is configured to be moved between a position in which the louver completely closes the inlet to the first air passage and directs all air flow from the blower through the second air passage through the plurality of slots in the heat guard and across the nozzle and a position in which the louver completely closes the inlet to the second air passage and directs all air flow from the blower through the first air passage across the heat sink and through the outlet. In some example embodiments, the louver is configured to also be moved to various in-between positions to control an amount of the air flow that is directed to the first air passage and an amount of the air flow that is directed to the second air passage to be set to various ratios.

These and other features, aspects, and advantages of the present invention will become better understood when the following detailed description of certain exemplary embodiments is read with reference to the accompanying drawings in which like characters represent like parts throughout the drawings.

DETAILED DESCRIPTION

Figure 1:
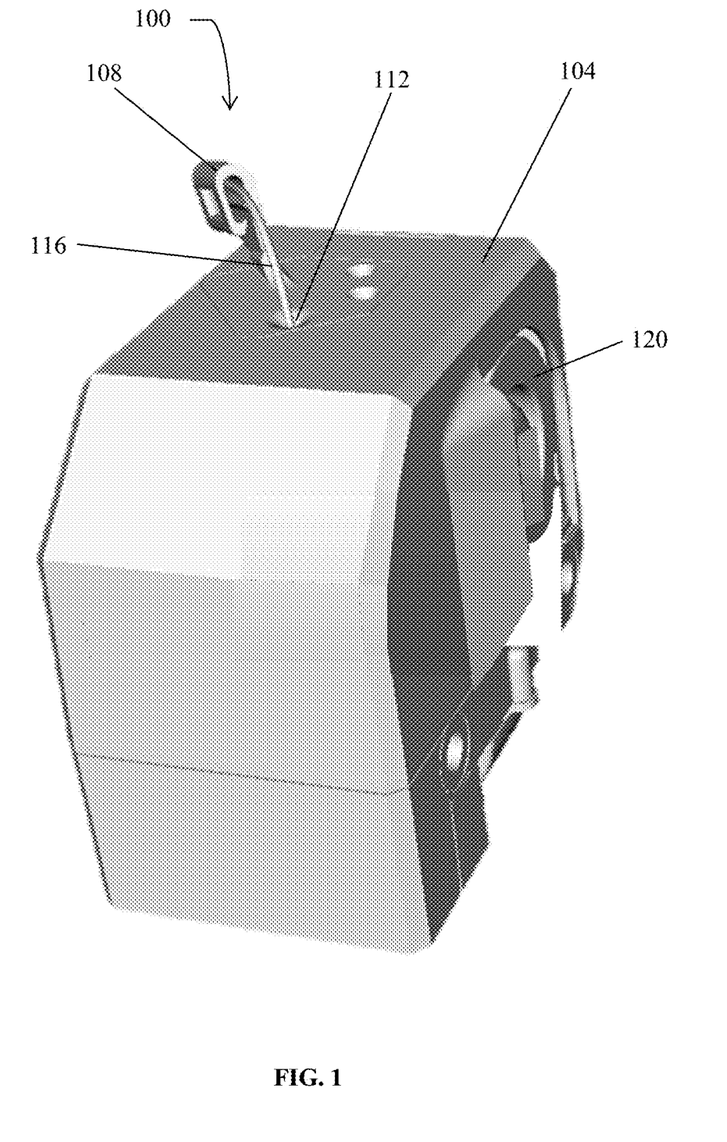
FIG. 1 is a partial perspective view of an extruder and extruder cover, according to an example embodiment of the present invention.

FIG. 1 shows extruder 100 that includes extruder cover 104, filament guide 108, filament inlet 112, and blower 120. Filament 116 is shown secured in filament guide 108 and entering extruder 100 through filament inlet 112. Filament guide 108 is integrated into or molded as a part of extruder cover 104 and guides filament 116 into filament inlet 112. Blower 120 is mounted on one side of extruder 100.

Figure 2A:
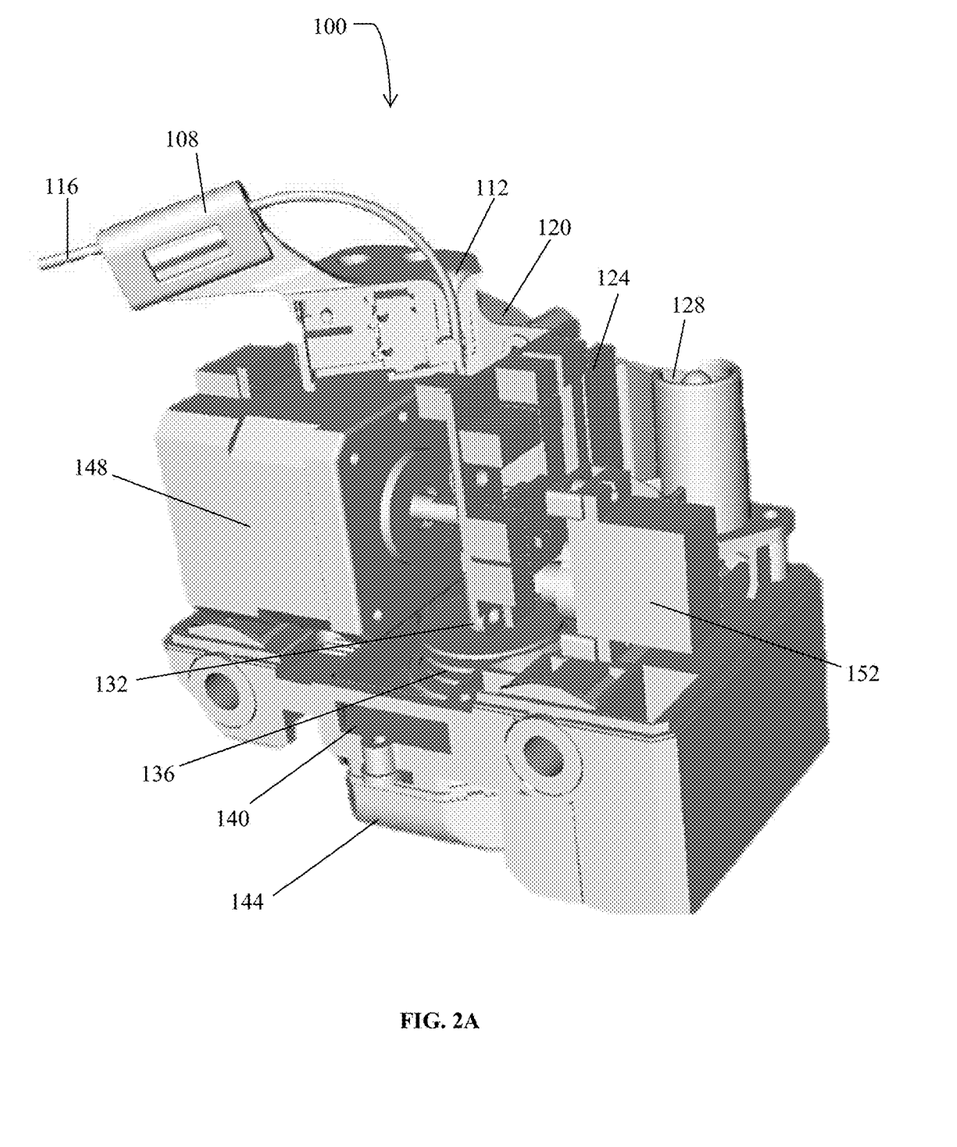
FIG. 2A is a partial perspective view of the extruder of FIG. 1 without the extruder cover, according to an example embodiment of the present invention.

FIG. 2A shows a cutaway view of extruder 100 of FIG. 1, where filament 116 is shown secured in filament guide 108 and entering extruder 100 through filament inlet 112. In FIG. 2A, extruder 100 is shown without the extruder cover, revealing circuitry system 124 connected to ribbon cable 128, feed tube 132, heat sink 136, outlet 140, heat guard 144, and a plurality of servomotors 148, 152. Compared to temperature control systems utilizing more than one blower, the illustrated embodiment uses just one blower 120, allowing circuitry system 124 to be arranged in the space that would have otherwise been occupied by any additional blower or fan. Additionally, circuitry system 124, through the connected ribbon cable 128, can control multiple components of extruder 100 from within extruder 100 by relaying operating information to ribbon cable 128. By having this single, more robust ribbon cable 128 connected to a motherboard underneath the 3-D printer to control multiple components of extruder 100, the need to run multiple, separate wires for each component from the motherboard underneath the 3-D printer is eliminated. Circuitry system 124 can control the power for extruder 100, blower 120, a plurality of microswitches, a plurality of servomotors 148, 152, a leveling arm, a stepper motor, and heating block 156 (shown in FIGS. 3 and 4), which includes a heater and a thermocouple.

Figure 2B:
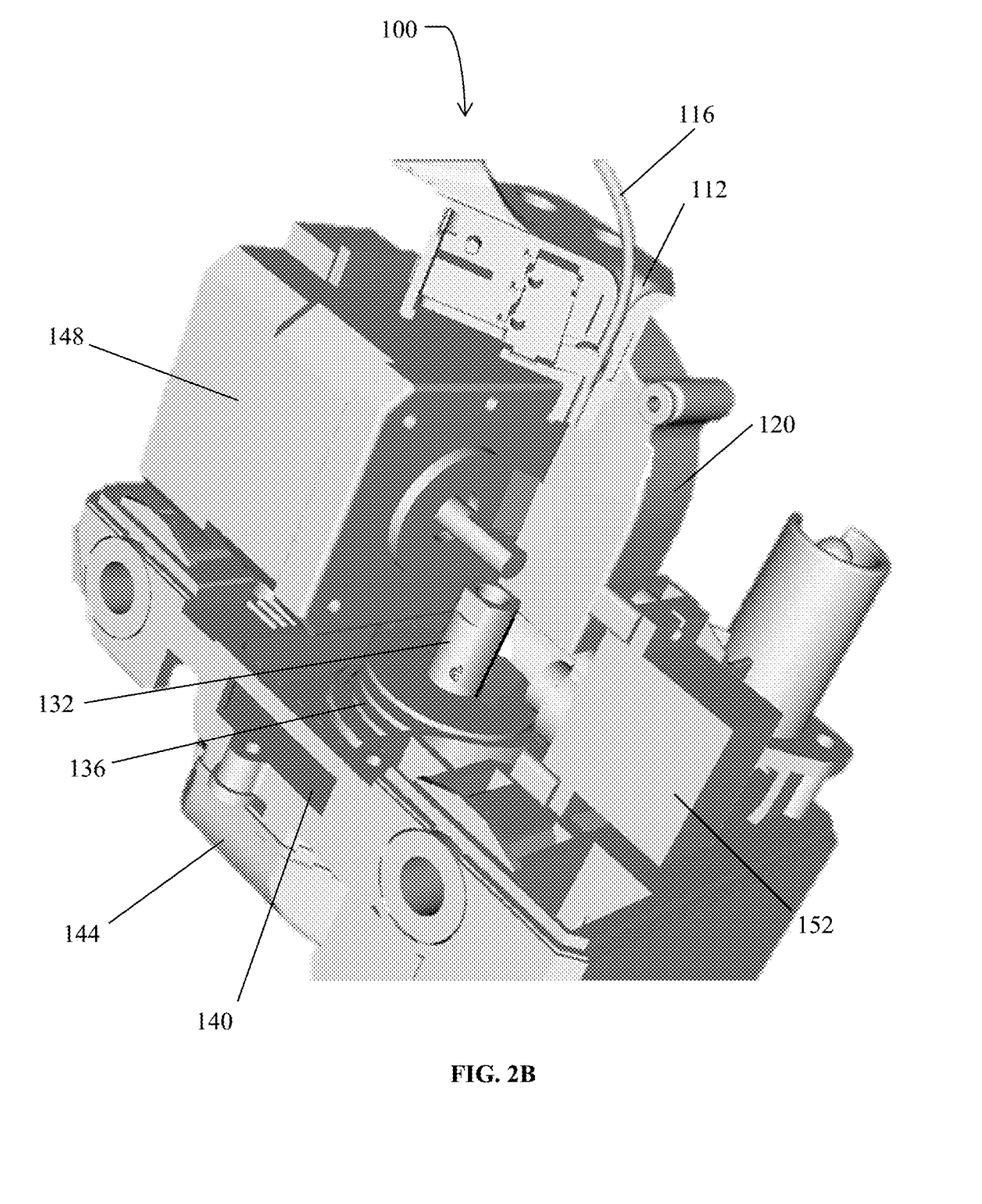
FIG. 2B is a partial perspective view of the extruder of FIG. 2A with more components removed, according to an example embodiment of the present invention.

FIG. 2B shows extruder 100 of FIG. 2A without the circuitry system 124 and ribbon cable 128 for a clearer view of feed tube 132 and blower 120.

Figure 3:
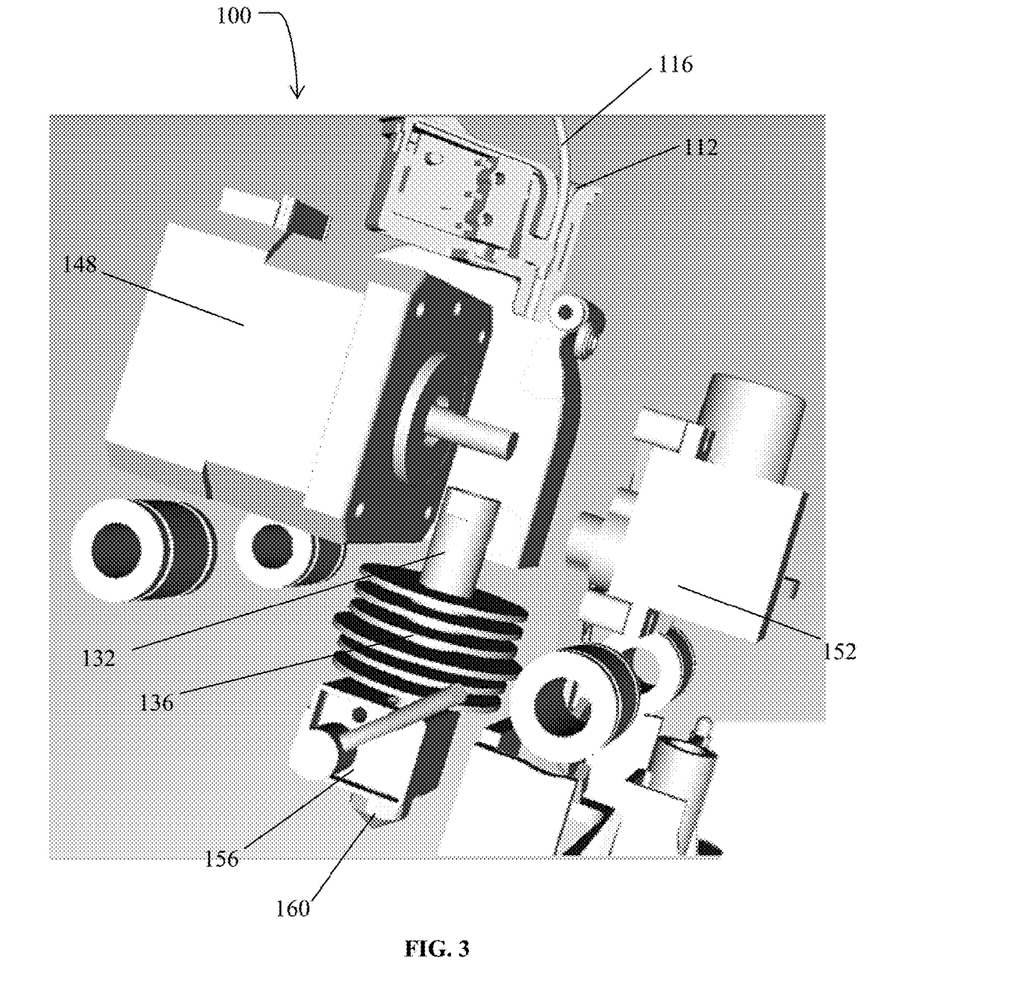
FIG. 3 is another partial perspective view of the extruder of FIG. 1 without the extruder cover and other components, according to an example embodiment of the present invention.

FIG. 3 shows extruder 100 with more components removed for a clearer view of feed tube 132, heat sink 136, heating block 156, and nozzle 160. Heat sink 136 is shown as a circular heat sink of rings that surrounds feed tube 132. Heating block 156 also surrounds feed tube 132 and is positioned below heat sink 136. Nozzle 160 is on the distal end of feed tube 132 and protrudes from heating block 156. Heat guard 144, shown in FIG. 4, surrounds heating block 156. Filament 116 passes through feed tube 132 and into the portion of feed tube 132 that is surrounded by heating block 156. Heating block 156 contains a heater and a temperature measuring element, such as a thermistor or a thermocouple. Heating block 156 heats the portion of the feed tube 132 that is surrounded by heating block 156, and also heats nozzle 160, in turn conducting heat into filament 116 such that filament 116 exits the nozzle 160 in heated, melted form for building the 3-D object. Heat from heating block 156 travels up feed tube 132 from the portion of the feed tube 132 surrounded by heating block 156, which can cause premature heating of filament 116. While heat sink 136 serves to pull heat away from feed tube 132 that is not surrounded by heating block 156, the temperature control system according to example embodiments of the present invention provide additional cooling and temperature control of feed tube 132, heat sink 136, and nozzle 160.

Figure 4:
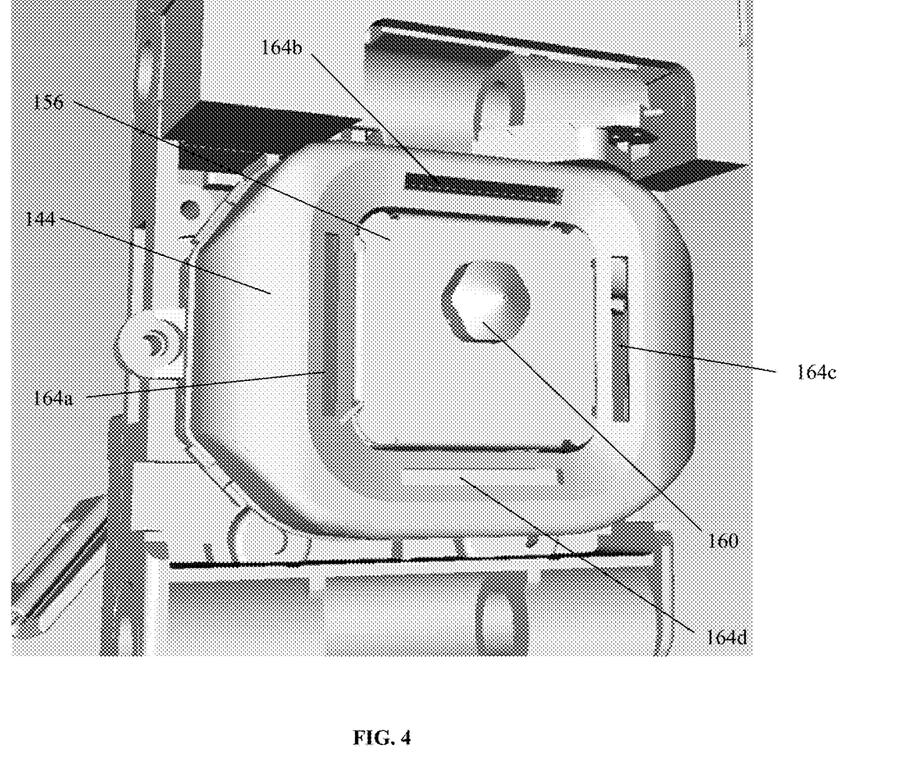
FIG. 4 is a partial perspective view of the underside of the extruder, according to an example embodiment of the present invention.

FIG. 4 show the underside of extruder 100. Heating block 156 is surrounded by heat guard 144, which contains a plurality of outlet slots 164a, 164b, 164c, 164d. The plurality of outlet slots in heat guard 144 can consist of any number of outlet slots, and four outlet slots 164a, 164b, 164c, 164d are shown in FIG. 4. As shown in FIG. 4, the four outlet slots 164a, 164b, 164c, 164d are arranged in heat guard 144 to surround nozzle 160, where first outlet slot 164a is at a ninety degree angle to second outlet slot 164b, which is at a ninety degree angle to third outlet slot 164c, which is at a ninety degree angle to fourth outlet slot 164d, resulting in first outlet slot 164a being parallel with third outlet slot 164c, and second outlet slot 164b being parallel with fourth outlet slot 164d. Heat guard 144 can be held in place using any type of adhesive or film, such as polyimide film, that remains stable across a wide range of temperatures.

Figure 5:
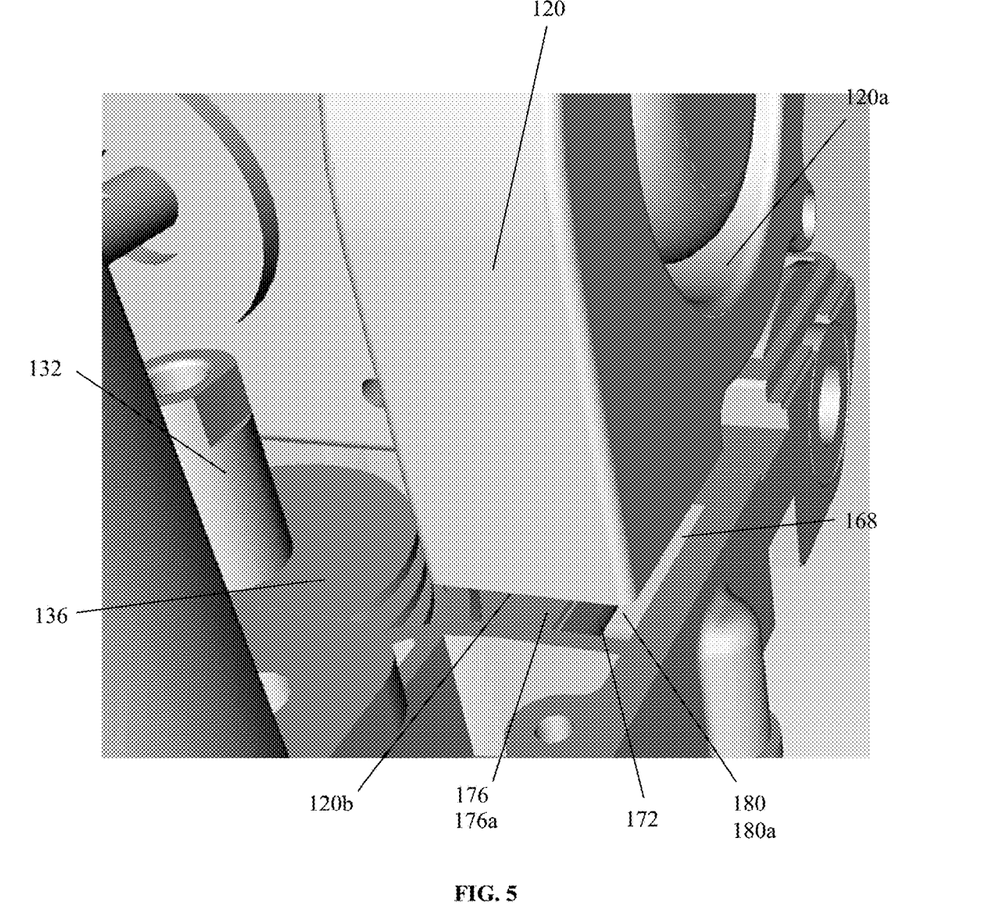
FIG. 5 is a partial perspective view of the blower of the extruder, according to an example embodiment of the present invention.
Figure 6:
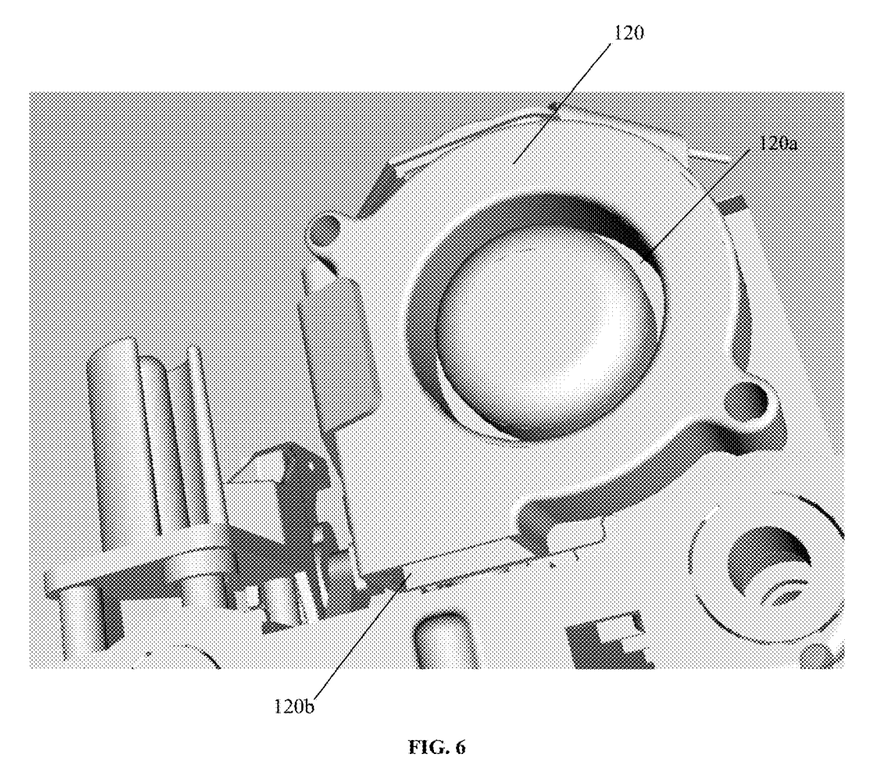
FIG. 6 is another partial perspective view of the blower of the extruder, according to an example embodiment of the present invention.

FIG. 5 shows blower 120 with air inlet 120a and air exit 120b (shown more clearly in FIG. 6). A baffling system is shown, which includes channel 168 that is molded into extruder 100 and is divided by at least one baffle 172 into at least two air passages 176, 180, where each of the at least two air passages 176, 180 has its own respective inlet 176a, 180a. Channel 168 is positioned below air exit 120b of blower 120 such that air flow from air exit 120b of blower 120 enters channel 168. A large gap is shown in FIG. 5 between channel 168 and air exit 120b of blower 120 for clarity.

Air flow from blower 120 is directed, through the baffling system, to different components of the extruder to cool these different components. First air passage 176 of the at least two air passages directs a portion of air flow from blower 120 across heat sink 136 and through outlet 140, cooling and providing temperature control to feed tube 132 and heat sink 136. Second air passage 180 of the at least two air passages directs another portion of air flow from blower 120 towards and then through the plurality of slots 164a, 164b, 164c, 164d in heat guard 144 and across nozzle 160, cooling and providing temperature control to nozzle 160, as well as the surrounding area where filament 116 is laid down for building the 3-D object. Thus, a single blower 120 provides efficient temperature control to multiple components of extruder 100.

FIG. 6 shows blower 120 with air inlet 120a and air exit 120b. In an example embodiment, air inlet 120a of blower 120 is a fan with a plurality of fins. Air flows into blower 120 through air inlet 120a, exits blower 120 through air exit 120b, and enters channel 168, first air passage 176, and second air passage 180 of the baffling system to simultaneously cool multiple components of extruder 100.

In an example embodiment, extruder 100 contains a louver that can alter the size of the openings of inlets 176a, 180a to the at least two air passages 176, 180. In one example embodiment, the louver can at least partially close inlet 176a to direct less air flow into first air passage 176 and more air flow into second air passage 180 to provide more cooling to nozzle 160. In an example embodiment, the louver can at least partially close inlet 180a to direct less air flow into second air passage 180 and more air flow into first air passage 176 to provide more cooling to feed tube 132 and heat sink 136. In an example embodiment, the louver can completely close inlet 176a to the first air passage 176 and direct all air flow from blower 120 through second air passage 180 through plurality of slots 164a, 164b, 164c, 164d in heat guard 144 and across nozzle 160. In an example embodiment, the louver can completely close inlet 180a to second air passage 180 and direct all air flow from blower 120 through first air passage 176 across heat sink 136 and feed tube 132, and out outlet 140. The ability to provide specific control over the amount of cooling to specific components of extruder 100 can accommodate filament material that requires hotter or cooler temperatures.

An example embodiment of the present invention is directed to processing circuitry configured to output a control signal that controls a motor to move the louver to a suitable position depending on an operating state (e.g., sensed temperatures at the various components) and/or depending on a current filament being used. In example embodiments, the processing circuitry, for example, includes one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform the control. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory computer-readable media, e.g., as described above, on which are stored instructions that are executable by a processor and that, when executed by the processor, perform the control.

An example embodiment of the present invention is directed to a method, e.g., of a hardware component or machine, of transmitting instructions executable by a processor to perform the control.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and the following claims.

What is claimed is:
1. An extruder comprising:
a feed tube;
a filament inlet arranged for feeding filament from outside the extruder into the feed tube;
a heat sink below the filament inlet and surrounding a portion of the feed tube;

a heating block below the heat sink and surrounding a portion of the feed tube;
a heat guard surrounding at least a portion of the heating block and including one or more outlet slots;
a nozzle on a distal end of the feed tube and protruding out of the heating block;
a blower with an air inlet and an air exit;
at least one baffle;
a channel that is positioned below the air exit of the blower such that air flow from the air exit of the blower enters the channel and that is divided by the at least one baffle into at least two air passages, each of the at least two air passages with its own respective inlet, wherein:
a first air passage of the at least two air passages is configured to direct a portion of the air flow across the heat sink and through an outlet; and
a second air passage of the at least two air passages is configured to direct another portion of the air flow towards and through the one or more outlet slots in the heat guard and across the nozzle; and
a louver for controlling the air flow for the at least two air passages divided by the at least one baffle, wherein, for each of at least one of the at least two air passages, the louver is configured to at least partially close the respective inlet to the respective air passage.

2. The extruder of claim 1, wherein the one or more of outlet slots in the heat guard includes four outlet slots.

3. The extruder of claim 2, wherein the four outlet slots are configured in the heat guard to surround the nozzle such that a first pair of the four outlet slots are arranged parallel to each other on opposite sides of the nozzle, and a second pair of the four outlet slots are arranged parallel to each other on opposite sides of the nozzle, each of the slots of the first pair being approximately perpendicular to each of the slots of the second pair.

4. The extruder of claim 1, wherein the heating block includes a heater and a thermocouple.

5. The extruder of claim 4, further comprising:
a circuitry system;
a plurality of microswitches;
a ribbon cable;
a plurality of servomotors;
a leveling arm; and
a stepper motor; wherein the circuitry system is configured to relay operating information to the ribbon cable to control the blower, the plurality of microswitches, the plurality of servomotors, the leveling arm, the stepper motor, and the heating block.

6. The extruder of claim 5, wherein the ribbon cable is attached to a motherboard.

7. The extruder of claim 5, wherein one of the plurality of microswitches is a sensor configured to sense runout of filament.

8. The extruder of claim 1, further comprising an extruder housing and a filament guide that is integrated into the extruder housing and is configured to guide filament into the filament inlet.

9. The extruder of claim 1, wherein the blower is mounted on one side of a longitudinal axis of the feed tube.

10. The extruder of claim 1, wherein the blower comprises a fan with a plurality of fins.

11. The extruder of claim 1, wherein the louver is configured to completely close the inlet to the first air passage, thereby directing all of the air flow from the blower through the second air passage towards and through the one or more outlet slots in the heat guard and across the nozzle.

12. The extruder of claim 1, wherein the louver is configured to completely close the inlet to the second air passage, thereby directing all of the air flow from the blower through the first air passage across the heat sink and through the outlet.

13. The extruder of claim 1, wherein the louver is configured to be shifted into a plurality of positions, each corresponding to a different respective ratio of an amount of the air flow being directed into the first air passage to an amount of the air flow being directed into the second air passage.

14. An extruder cooling control system comprising:
processing circuitry; and
a non-transitory computer-readable medium that includes instructions that are executable by the processing circuitry and that, when executed by the processing circuitry, cause the processing circuitry to perform a control of a louver of an extruder to which the processing circuitry is configured to be communicatively coupled, wherein:
the extruder includes a motor, a filament inlet arranged for feeding filament from outside the extruder u and towards and through a nozzle arranged on a bottom end of the feed tube, a heat sink surrounding a portion of the feed tube, a heating block below the heat sink and surrounding a portion of the feed tube with the nozzle protruding out of the heating block, a heat guard surrounding at least a portion of the heating block and including one or more outlet slots, a blower with an air inlet and an air exit, a channel that is positioned below the air exit of the blower such that air flow from the air exit of the blower enters the channel and that is divided, by at least one baffle, into at least two air passages, each of the at least two air passages with its own respective inlet, a first air passage of the at least two air passages being configured to direct a portion of the air flow across the heat sink and through an outlet, and a second air passage of the at least two air passages being configured to direct another portion of the air flow towards and through the one or more outlet slots in the heat guard and across the nozzle;
for each of at least one of the at least two air passages, the louver, which is configured to control the air flow for the at least two air passages divided by the at least one baffle, is configured to at least partially close the respective inlet to the respective air passage; and
the method comprises, at least one of responsive to a sensed operating state of the extruder and based on a received input identifying a material of the filament, outputting a signal to the motor to shift a position of the louver, thereby modifying a ratio of an amount of the air flow being directed into the first air passage to an amount of the air flow being directed into the second air passage.

* * * * *